July 19, 1966 J. K. SHANNON 3,261,719
STORAGE BATTERY WITH BOTTOM ASSEMBLY
Filed March 27, 1963 4 Sheets-Sheet 1
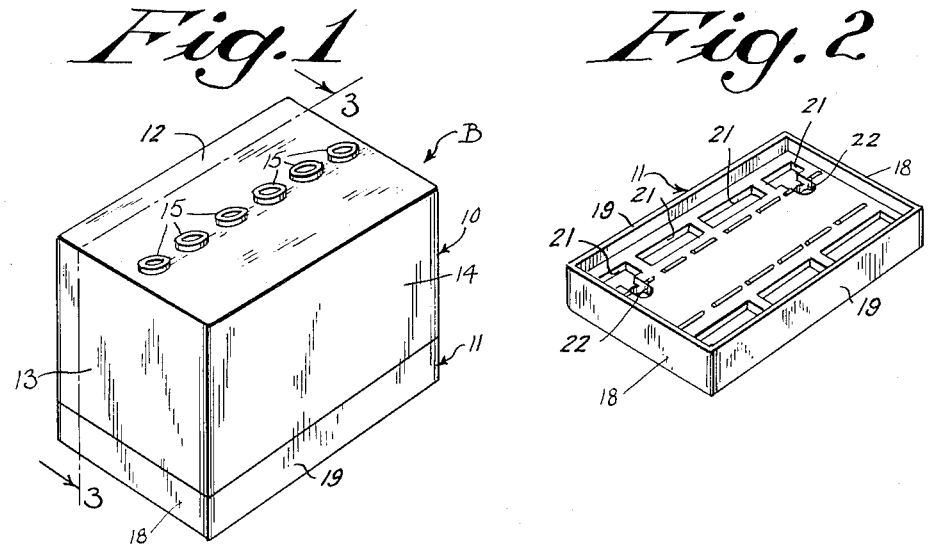
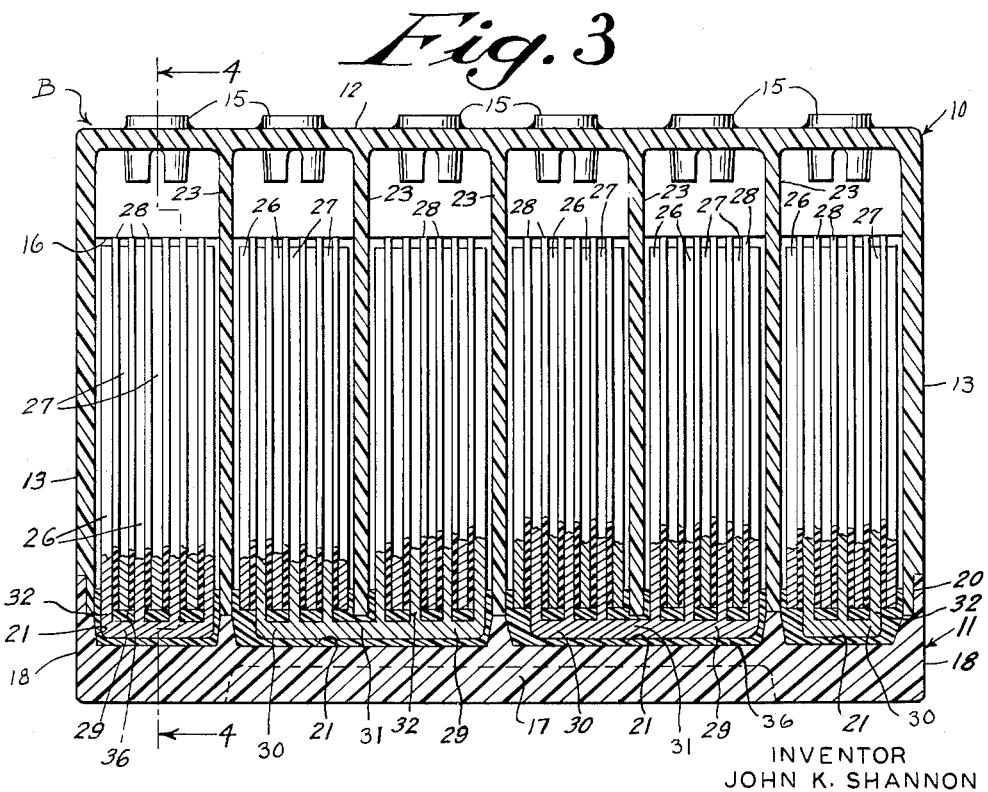
INVENTOR
JOHN K. SHANNON
BY Wright & Wright
ATTORNEYS

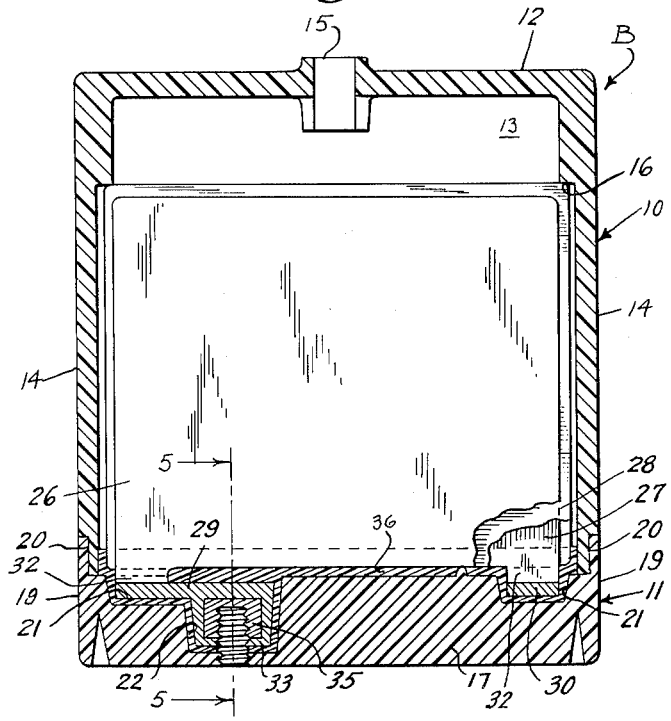
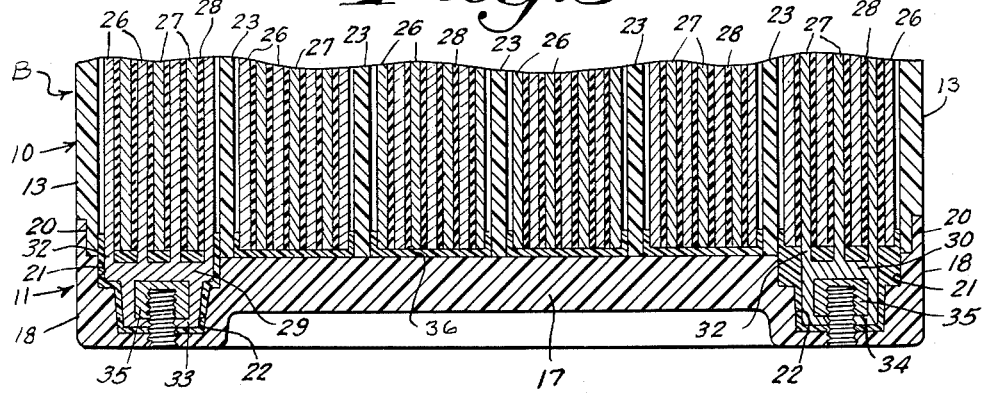

July 19, 1966 J. K. SHANNON 3,261,719
STORAGE BATTERY WITH BOTTOM ASSEMBLY
Filed March 27, 1963 4 Sheets-Sheet 3
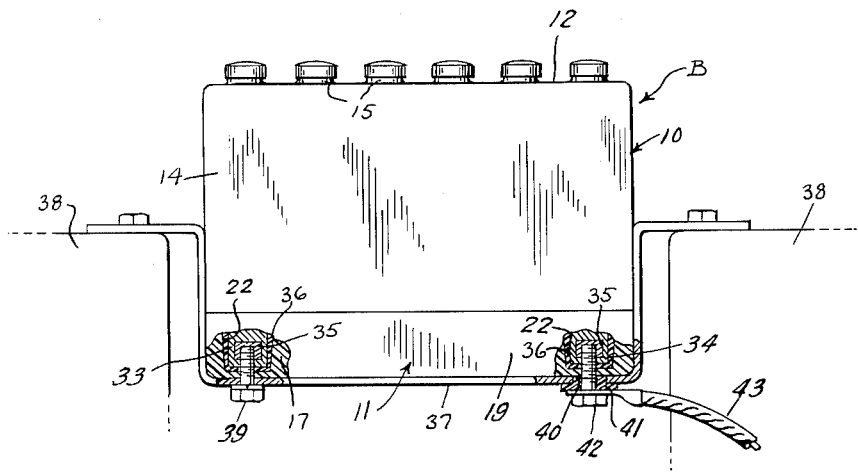
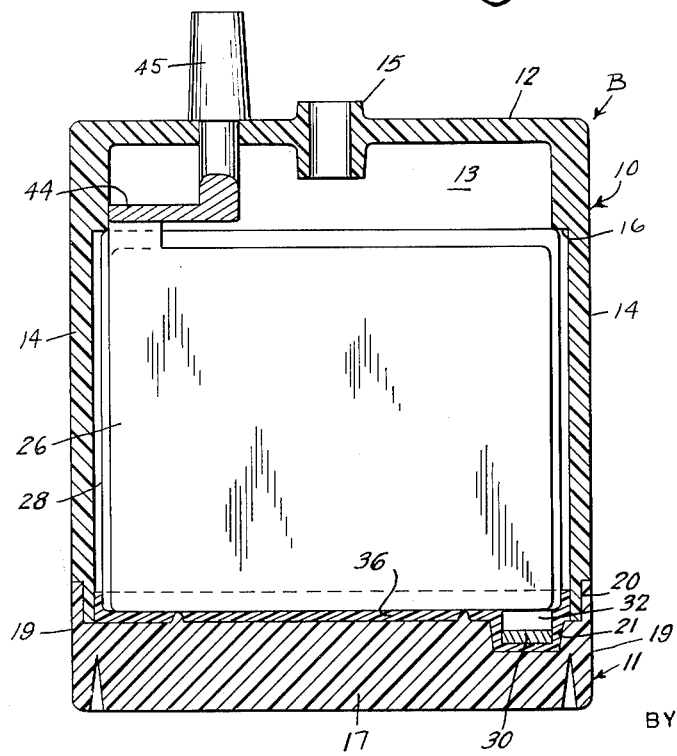
INVENTOR
JOHN K. SHANNON
BY *Wright & Wright*
ATTORNEYS July 19, 1966  J. K. SHANNON  3,261,719
STORAGE BATTERY WITH BOTTOM ASSEMBLY
Filed March 27, 1963  4 Sheets-Sheet 4
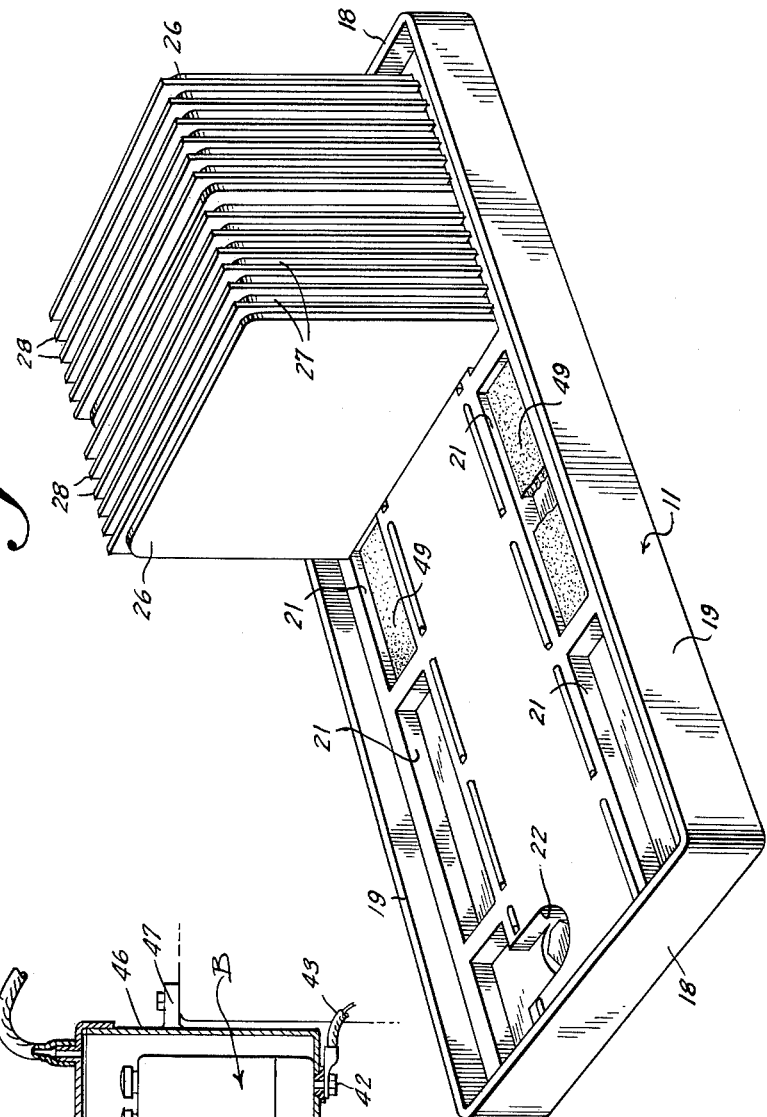
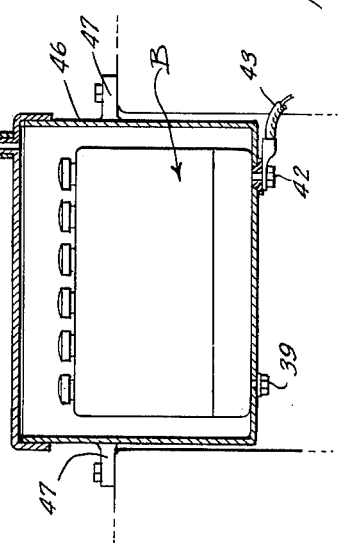
INVENTOR
JOHN K. SHANNON
BY
*Wright & Wright*
ATTORNEYS United States Patent Office
3,261,719
Patented July 19, 1966

3,261,719
STORAGE BATTERY WITH BOTTOM ASSEMBLY
John K. Shannon, 2028 63rd Place, Kenosha, Wis.
Filed Mar. 27, 1963, Ser. No. 268,245
15 Claims. (Cl. 136—134)

This invention appertains to storage batteries and more particularly to storage battery containers and a novel means and method of uniting plate and cell connector straps and terminal posts in a unitized construction.

In all storage batteries with which I am familiar, it is customary to provide a case and a top cover therefor, and to assemble the plate cell groups in the case with their plate and cell connector straps uppermost, and to then apply the cover to the case with the terminal posts projecting out through the upper end of the battery. In this type of battery, elongated posts and plate lugs are a necessity in order to permit the connection of cell plate groups by straps and to insure the proper positioning of the cell plate groups in their cell compartments and this adds to the cost and weight of the battery and no adequate means is provided for supporting the plates and protecting their lugs. Further, expensive cables and clamps are necessary for the positive and negative terminal posts, and usually clamps are provided for holding the battery tight down on its supporting pan, shelf or brackets, as the case may be. With the use of a top cover, a smooth appearing battery is not had and the various protuberances and crevices therein act as retainers for debris and dirt, which is detrimental to the motor vehicle and to the battery.

It is therefore one of the prmiary objects of my present invention to provide a storage battery in which the top wall of the container or case is molded directly on the side walls of the container or case to give a desired clean appearance to the entire battery and to affix a base on the case at the time of the assembly of the battery and to locate the plate lugs, the plate and cell connector straps at the bottom of the battery, whereby the cell plate groups can be readily connected and whereby long plate lugs can be eliminated, and this provides a saving of material and the giving of a light weight, more rugged battery.

Another salient object of the invention is to provide a base for the battery case which can be molded on or otherwise secured to the case having cavities in its upper face for receiving the plate and cell connector straps, so that cell plate groups can be placed in close proximity to the base and whereby such straps and the lower ends of the cell plate groups can be covered by the plastic material utilized for joining the base with the case, so that when such plastic material solidifies and combines with the base and case, a sturdy short resistant battery will be had.

A further important object of the invention is to provide means whereby the terminal posts can be brought through the base and utilized as means for securing the battery firmly to the supporting pan, shelf or brackets, as the case may be, by utilizing bolts passing through the support and into the posts, such connections forming a superior means for grounding a terminal post to the frame of the car without the use of a cable, the other terminal post being insulated from the support and receiving the live cable which can be connected to the post by the same bolt utilized for holding the battery in place.

A still further object of the invention is to provide a storage battery which is particularly useful for airplanes, wherein the battery is placed within a housing to eliminate the escape of fumes from the battery into the plane, in that, the bottom terminal posts can be brought through the bottom wall of the housing and sealed tight therewith to prevent the escape of fumes and whereby battery connections can be made entirely exteriorly of that housing.

A still further important object of my invention is to provide means, whereby the cavities in the inner face of the base can be used for receiving and retaining molten lead, so that the plate, terminal posts and cell connector straps can be cast directly on the groups of cell plates during the assembly of such groups on the base and prior to the placing of the plastic material in the base.

Another further object of the invention is to provide a battery and associated support which can be physically and electrically connected to each other in a manner which insures against arcing, and yet securely supports the battery.

A related object is to provide a battery and associated support which are of such simplicity as to achieve an irreducible minimum of economy in fabrication and maximum utilization.

With these and other objects in view, the invention consists in the novel construction, arrangement and formatio of parts, as will be hereiafter more specifically described and claimed, and illustrated in the accompanying drawings, in which drawings, FIGURE 1 is a perspective view of a complete battery made in accordance with this invention;

FIGURE 2 is a perspective view of the bottom closure shell or base prior to the uniting thereof with the main container or case;

FIGURE 3 is a longitudinal vertical sectional view through the complete battery taken on the line 3—3 of FIGURE 1, looking in the direction of the arrows and showing the relation of the cell and plate connector straps with the bottom shell or base and the sealing and embedding of the connector straps and lower ends of cell groups in the plastic material utilized for connecting the shell or base with the container or case;

FIGURE 4 is a transverse sectional view through the complete battery taken on the line 4—4 of FIGURE 1, looking in the direction of the arrows;

FIGURE 5 is a fragmentary longitudinal sectional view through the lower end of the complete battery taken on the line 5—5 of FIGURE 4, looking in the direction of the arrows, and showing the novel arrangement of the negative and positive terminal posts of the battery;

FIGURE 6 is a side elevational view partly broken away and in section illustrating the novel means of connecting my battery with its supporting pan, shelf or bracket, as the case may be, the view further showing the grounding of the negative post with the bracket and connection of the cable with the positive terminal post;

FIGURE 7 is a transverse sectional view through a modified form of my battery wherein the terminal posts are brought through the top wall of the container for the case;

FIGURE 8 is a detail sectional view showing my battery enclosed in a housing and illustrating the connection of the terminal posts with such housing, the construction shown being particularly adaptable for use in airplanes and the like, and FIGURE 9 is a perspective view showing the means whereby connector straps and the like can be cast directly on plate lugs, terminal posts etc. during the assembling of the battery.

Referring to the drawings in detail, wherein similar reference characters designate corresponding parts throughout the several views, the letter B generally indicates my improved battery and the same includes a molded container or case 10 and a bottom closure shell or base 11.

The case or container is pre-molded and includes a smooth top wall 12 and depending integral end walls 13 and side walls 14. The top wall can be provided with filling necks 15 which are closed by suitable caps, not shown. The inner faces of the side walls 14 adjacent to but spaced from the upper wall 12 are provided with longitudinally extending shoulders 16, which function to hold down cell plate groups, as will later appear.

The bottom closure shell or base 11 is also pre-molded and the same includes a bottom wall 17 and upstanding end and side flanges 18 and 19. The lower edges of the end walls 13 and 14 of the battery case or container can be rabbeted, as at 20, to receive the upper ends of the flanges and to form an abutment shoulder therefor. If preferred, the rabbet can be made on the inside of the container and the cover shell or base 11 fitted therein. The upper face of the bottom wall 17 is provided with spaced elongated cavities 21 which form seats for receiving plate and cell connector straps, as will also later appear. End cavities 21 can be provided with laterally projecting extensions 22 which open out through the bottom of the closure shell or base for receiving terminal posts, as will later appear.

The case or container 10 is also provided with spaced transversely extending partitions 23 which extend down from the top wall 12 of the case and across the case to the side walls 14 thereof to provide individual cells. In the present instance, I have shown a six cell battery, but it is to be understood that more or less cells can be provided without departing from the spirit or scope of this invention.

I provide cell plate groups for each battery cell, and these groups include alternately arranged positive and negative plates 26 and 27, spaced by separators 28. The negative plates are connected by connector straps 29 and the positive plates are connected by connector straps 30. In adjacent cells, connector straps 31 connect the plate straps 29 of the negative plates with the plate straps 30 of the positive plates, and it is to be noted that the cell connector straps 31 actually form continuations of the plate straps 29 and 30. It is to be also noted at this point, that all cell plates are provided with extremely short lugs 32 to which the connector straps are united. The connector straps 29 for the negative plates of one end cell have formed thereon a negative terminal post 33 and the connector strap 30 for the positive plates of the opposite end cell has formed thereon a positive terminal post 34 and these posts depend in a downward direction from their end cell plate groups.

During the molding or burning in of the terminal posts 33 and 34, I prefer to embed therein nuts 35 of a conducting material which will be of greater density and hardness than the lead utilized for the posts and the purpose of this will later appear.

Another phase of the invention relates to the method of assembly. It will be appreciated as the description of an exemplary method proceeds, that it not only is inherently economical, but also insures a reliable unitized construction. The bottom closure shell or base 11 is placed uppermost as shown in FIGURE 2 and the connected plate cell groups, as just described, are placed with their lower ends in the base and the plate and cell connector straps 29, 30 and 31 are placed in the cavities 21 with the terminal posts 33 and 34 in the openings 22. A desired type of plastic 36 in a free flowing state is now inserted into the base 11 to a certain prescribed level, and until the plate and cell connector straps and plate lugs are completely covered and the lower edges of the plate groups including their separators are also covered. This plastic material flows around any space between the terminal posts and the walls of the cavities and openings 22. The battery case 10 in its upright position is now slipped over the cell groups and into the closure shell or base 11 and the plastic material can flow through any crevices between the shell and the container or case. A plastic material is utilized which is compatible with the material forming the case 10 and closure shell or base 11, so that when this material solidifies the same in effect, will combine directly with the case and base to form therewith a homogeneous whole. The plastic material utilized can be a liquid epoxy resin mixed with diethylenetriamine.

At the time desired, the electrolyte can be poured into the cells through the vent openings or necks 15 to the usual level.

By referring to FIGURE 4, it can be seen that the shoulders 16 on the case or container engage the upper edges of the separators and these shoulders function to hold the separators and plates firmly down against the closure shell or base 11 during the hardening of the plastic material. These shoulders also form a means for resisting any tendency of the plate cell groups to break away from the base 11 incident to extremely rough handling of the battery.

From the foregoing, it can be seen that a smooth, clean looking battery is produced and one in which plate cell groups, plate and cell connector straps, and plate lugs are all bonded and held by the bottom wall closure structure which produces an exceptionally rugged battery and one in which the shorting of the cells is minimized.

One of the additional features of the invention is the battery support. An illustrative support is indicated by the reference character 37 in FIGURE 6. The support should be formed as a pan, shelf or end bracket, the support being secured to and grounded to the adjacent motor vehicle frame parts 38 or any other element of which the battery forms a significant power unit in the circuit. With the battery fitted in and on the support a holding bolt 39 is passed completely through the support and tightly threaded into one terminal post 33. Actually, the bolt 39 is threaded into its nut 35 so that an adequate threaded connection will be had between the terminal post and bolt. This bolt functions to electrically connect the terminal post to the support and to associated frame parts and to firmly hold the battery on the support. The support adjacent to the other terminal post 34 is provided with a large opening 40 which receives an insulating grommet 41. A bolt 42 is passed through the grommet 41 and into the terminal post 34 and its nut 35 and this bolt also functions to firmly hold the battery on its support. The positive cable 43 is also connected to the terminal post 34 by the bolt 42. By this arrangement, it can be seen that an extraordinarily simple means is provided for grounding the battery and for connecting the cable with the terminal post and that only one cable is necessary, and that clamps and the like are eliminated. Also the necessity for holding clamps to connect the battery with its support is eliminated. By connecting one terminal post with the support first and then extending the other post through the insulating grommet, arcing of the battery is eliminated.

In some instances, it is desirable to bring the terminal post through the upper wall of the battery case and hence, in FIGURE 7, I have shown end plate cell groups with their connector straps 44 uppermost and these straps have burned or formed thereon the terminal posts 45. In this form, the other connector straps are lowermost and are embedded in the plastic material utilized for joining the base 11 with the case or container. The posts 45 can be either brought through the top wall of the case as shown, or through the side walls of the case.

While I have shown a pre-molded bottom shell or base, it is to be also understood that the bottom or base can be molded directly on the container or case by using a properly proportioned mold for receiving the plastic material.

As heretofore described, my battery B lends itself admirably for use in airplanes and other places where fumes from the battery cannot be readily dissipated and where danger of explosion is present. Thus, in FIGURE 8, I have shown my battery B positioned within a receiving housing 46. The housing can be of any shape or size and can be carried in any fashion by frame members of the aircraft, as shown at 47 in FIG. 8. This view clearly shows how the terminal posts can be brought through the bottom wall of the housing in the same manner as shown through the support in FIGURE 6. Thus, all connections to the battery are made exteriorly of the housing. The housing can have connected thereto a tube 48 which can lead exteriorly of the fuselage of the airplane so that any fumes collected in the housing can be discharged out of the airplane.

My bottom shell or base 11 also forms an admirable means whereby terminal posts, plate and cell connector straps can be molded directly on plate lugs 32. Thus, the cavities 21 and their terminal extensions 22 can form molds for receiving molten lead to form plate lug and cell connector straps and terminal post connectors. In FIGURE 9, I have shown certain cavities filled with the molten lead 49 with cell groups placed in position and with their lugs placed in the molten metal. A desired amount of molten lead is injected into the cavities. The plate cell groups are held in proper spaced relationship with the plate lugs facing down. While the lead is still molten all the lugs of the plates enter the lead simultaneously. As the molten metal cools, the same unitizes with the plate lugs. This forms a very satisfactory, quick and efficient means for casting plate connector straps directly on plate lugs and cell connector straps and terminal posts during the assembly of the battery. With all cell groups in position and the connector straps solidified, then the plastic material can be inserted within the base and the method of assembling the battery continued as heretofore brought out.

Various changes in details may be made without departing from the spirit or the scope of this invention, but what is claimed as new is:

1. A storage battery comprising a premolded case including an integral substantially flat top wall and depending side walls, a base for the case and said case also having transversely extending partitions defining individual cells, said partitions being formed on and depending from the top wall, plate cell groups in the cells and said cell groups being connected in proper order by cell connector straps disposed in engagement with the base and terminal posts for the negative and positive plates of terminal cells.

2. The storage battery of claim 1 having, in addition, bottom plate connector straps for connecting like plates together.

3. A storage battery comprising a case including an integral top wall and depending side walls, transverse partitions forming individual cells in said case depending from the top wall, a bottom base for receiving the lower edges of the side walls of the case, plate cell groups in said cells having bottom plate connector straps and cell connector straps disposed in engagement with the inner face of the base, said base comprising a tray with molded plastic material therein, said plastic material completely covering the plate and cell connector straps.

4. A storage battery as defined in claim 3 in which said plastic material also covers the lower edges of the plate cell groups to unite said groups with the base through said plastic material.

5. The storage battery as defined in claim 3, and terminal posts for terminal cell groups opening out through the bottom of the base.

6. A storage battery and support assembly comprising, in combination, terminal posts extending through the bottom of the battery, fastening electrical conductive means adapted to be securely inserted into said terminals, a support fashioned to receive the base and having two fastening apertures, insulating means inserted in one such aperture, the whole in such physical and electrical combination that one of the fastening means passes through a support aperture and into a terminal post thereby grounding the battery to the support while the other fastening means passes through the insulating means for connection to an electrical circuit.

7. A storage battery comprising a case including integral top, end and side walls, transversely extending partition plates in said case defining individual cells and depending from said top wall, a base for receiving the lower edges of the end and side walls, plate cell groups in said cells having plate connector and cell connector straps fitted against the inner face of the base, said connector straps for terminal cells having formed thereon depending terminal posts opening out through the base and a plastic material uniting the base with the battery case and enveloping completely the plate connector and cell connector straps and portions of said terminal posts.

8. The storage battery of claim 7, wherein said terminal posts have interior threads whereby the posts can be connected to a support by bolts.

9. The storage battery of claim 8, with a support for said battery and bolts passing through said support into said posts.

10. The storage battery of claim 7, wherein said plastic material also envelops the lower edges of the cell plate groups.

11. The storage battery of claim 7, wherein said case has interior upper shoulders for engaging the upper edges of the plate cell groups and holding same.

12. A storage battery comprising a premolded case having integral top, end and side walls and transversely extending cell partition plates, said top wall having vent and filling openings for the cells, a base for receiving the lower edges of the end and side walls, the upper face of said base having plate and cell connector strap cavities and seats therein, plate cell groups for the cells with the plates connected in proper order by plate connector straps, the plate connector straps being united in proper order by cell connector straps and said plate and cell connector straps being fitted in the cavities, and terminal posts engaging said plate connector straps, and plastic material uniting the shell with the case completely enveloping the plate and cell connector straps and lower edges of plate cell groups and portions of said terminal posts.

13. In a storage battery assembly for use in enclosed areas comprising a storage battery having a negative terminal post extending through the bottom thereof and a positive terminal post extending through the bottom thereof, a housing for completely receiving and enclosing the battery and including a bottom wall having openings for receiving the negative and positive terminal posts, means for insulating and securing the one terminal post to the bottom wall and to a cable, means for grounding and securing the other terminal post to the bottom wall and means for leading any fumes collected in the housing therefrom to a remote point.

14. A storage battery comprising a pre-molded case including an integral substantially flat top wall and depending end and side walls, and depending transversely extending partitions defining individual cells, plate cell groups within said individual cells, plate connector straps connecting the plates of said plate cell group, cell connector straps connecting said plate cell groups, a base for the case including a bottom wall and upstanding end and side walls defining a tray, said bottom wall having cavities therein, said cavities forming molds for receiving molten lead to form said plate connector straps and said cell connector straps, terminal posts engaged with said plate connector straps and partially enveloped by said lead, and plastic material in said base covering said straps and portions of said terminal posts to seal said cavities and said base to said case.

15. A storage battery comprising a pre-molded case having integral top, end and side walls and transversely extending cell partition plates, said top wall having vent and filling openings for the cells, a base for receiving the lower edges of the end and side walls, the upper face of said base having plate and cell connector strap cavities and seats therein, plate cell groups for the cells with the plates connected in proper order by plate connector straps, the plate connector straps being united in proper order by cell connector straps and said plate and cell connector straps being fitted in the cavities, plastic material uniting the shell with the case completely enveloping the plate and cell connector straps and lower edges of plate cell groups, end plate cell groups having plate connector straps, said plate connector straps uniting said end plate cell groups of opposite polarity at the top portions thereof, and terminal posts engaging said plate connector straps and extending out through the upper end of the case.

References Cited by the Examiner

UNITED STATES PATENTS

| | | | |
|---|---|---|---|
| 1,507,936 | 9/1924 | Schmitt | 136—135 |
| 1,519,701 | 12/1924 | Poth | 136—171.5 |
| 2,104,765 | 1/1938 | Saunders | 136—171 |
| 2,159,042 | 5/1939 | Odell | 136—171.5 |
| 2,252,633 | 8/1941 | Jones et al. | 136—171.5 |
| 2,511,943 | 6/1950 | Reed | 136—134 |
| 2,801,276 | 7/1957 | Toce et al. | 136—166 |
| 2,911,682 | 11/1959 | Ewald | 18—58 |
| 2,942,058 | 6/1960 | Herold | 136—166 |
| 2,962,767 | 12/1960 | Trojanowski et al. | 18—58 |

FOREIGN PATENTS 1,064,130  8/1959  Germany.

WINSTON A. DOUGLAS, *Primary Examiner.*

JOHN H. MACK, ALLEN B. CURTIS, *Examiners.*

D. L. WALTON, *Assistant Examiner.*